US012464404B2

(12) United States Patent
Huang et al.

(10) Patent No.: US 12,464,404 B2
(45) Date of Patent: Nov. 4, 2025

(54) UPLINK FLOW CONTROL

(71) Applicant: QUALCOMM Incorporated, San Diego, CA (US)

(72) Inventors: Xiaolong Huang, Santee, CA (US); Srinivas Katar, Fremont, CA (US); Sandip Homchaudhuri, San Jose, CA (US); Guido Robert Frederiks, Watsonville, CA (US); Bhaskara Peela, Fremont, CA (US); James Simon Cho, Stateline, NV (US); Patrick Poon-Cheuk Chan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 17/944,978

(22) Filed: Sep. 14, 2022

(65) Prior Publication Data

US 2024/0089791 A1 Mar. 14, 2024

(51) Int. Cl.
*H04W 28/02* (2009.01)
*H04W 24/08* (2009.01)
(Continued)

(52) U.S. Cl.
CPC ....... *H04W 28/0273* (2013.01); *H04W 24/08* (2013.01); *H04W 28/0284* (2013.01);
(Continued)

(58) Field of Classification Search
CPC . H04W 28/0273; H04W 72/23; H04W 24/08; H04W 28/0284; H04W 72/1268; H04W 84/12
See application file for complete search history.

(56) References Cited

U.S. PATENT DOCUMENTS 11,751,093 B2* 9/2023 Narasimha ............. H04B 7/155
370/236
11,968,564 B2* 4/2024 Kerpez ................. H04L 41/142
(Continued)

FOREIGN PATENT DOCUMENTS

EP 3280166 A1 2/2018

OTHER PUBLICATIONS

International Search Report and Written Opinion—PCT/US2023/071234—ISA/EPO—Oct. 16, 2023.

*Primary Examiner* — Chandrahas B Patel
(74) *Attorney, Agent, or Firm* — Holland & Hart LLP

(57) ABSTRACT

Methods, systems, and devices for wireless communications are described. In some wireless communications systems, a wireless device may buffer uplink communications. However, such approaches may be improved. An access point (AP) may receive, from a station, uplink traffic of a traffic flow for forwarding to a backhaul network via a backhaul link. The AP may monitor a buffer of the AP to determine that a quantity of buffered uplink traffic received from the station exceeds a buffer quota, the buffer quota set for the traffic flow based on a traffic throughput capacity of the backhaul link and a throughput parameter for the traffic flow. The AP may modify, based on the quantity of buffered uplink traffic exceeding the buffer quota, an uplink communication scheme to reduce the quantity of uplink traffic from the station. The AP may communicate with the station based on the modified uplink communication scheme.

30 Claims, 9 Drawing Sheets

(51) Int. Cl.
*H04W 72/1268* (2023.01)
*H04W 72/23* (2023.01)
*H04W 84/12* (2009.01)

(52) U.S. Cl.
CPC ....... *H04W 72/1268* (2013.01); *H04W 72/23* (2023.01); *H04W 84/12* (2013.01)

(56) References Cited

U.S. PATENT DOCUMENTS

| | | |
|---|---|---|
| 2017/0273100 A1 | 9/2017 | Huang et al. |
| 2018/0097738 A1 | 4/2018 | Torres et al. |
| 2022/0361194 A1* | 11/2022 | Shafin ................. H04W 72/535 |

* cited by examiner

UPLINK FLOW CONTROL

BACKGROUND

The following relates to wireless communications, including uplink flow control.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

In some wireless communications systems, a wireless device (e.g., an access point) may buffer uplink traffic. However, such approaches may be improved.

SUMMARY

The described techniques relate to improved methods, systems, devices, or apparatuses that support uplink flow control. For example, an access point (AP) may receive, from a station, uplink traffic of a traffic flow for forwarding to a backhaul network via a backhaul link. The AP may monitor a buffer of the AP to determine that a quantity of buffered uplink traffic received from the station exceeds a buffer quota, the buffer quota set for the traffic flow based on a traffic throughput capacity of the backhaul link and a throughput parameter for the traffic flow. The AP may modify, based on the quantity of buffered uplink traffic exceeding the buffer quota, an uplink communication scheme to reduce the quantity of uplink traffic from the station. The AP may communicate with the station based on the modified uplink communication scheme.

A method for wireless communications at an access point is described. The method may include receiving, from a station, uplink traffic of a traffic flow for forwarding to a backhaul network via a backhaul link, monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow, modifying, based on the quantity of buffered uplink traffic exceeding the buffer quota, an uplink communication scheme to reduce the quantity of uplink traffic from the station, and communicating with the station based on the modified uplink communication scheme.

An apparatus for wireless communications at an access point is described. The apparatus may include a processor, memory coupled with the processor, and instructions stored in the memory. The instructions may be executable by the processor to cause the apparatus to receive, from a station, uplink traffic of a traffic flow for forwarding to a backhaul network via a backhaul link, monitor a buffer of the access point to determine that a quantity of buffered uplink traffic received from the station exceeds a buffer quota, the buffer quota set for the traffic flow based on a traffic throughput capacity of the backhaul link and a throughput parameter for the traffic flow, modify, based on the quantity of buffered uplink traffic exceeding the buffer quota, an uplink communication scheme to reduce the quantity of uplink traffic from the station, and communicate with the station based on the modified uplink communication scheme.

Another apparatus for wireless communications at an access point is described. The apparatus may include means for receiving, from a station, uplink traffic of a traffic flow for forwarding to a backhaul network via a backhaul link, means for monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow, means for modifying, based on the quantity of buffered uplink traffic exceeding the buffer quota, an uplink communication scheme to reduce the quantity of uplink traffic from the station, and means for communicating with the station based on the modified uplink communication scheme.

A non-transitory computer-readable medium storing code for wireless communications at an access point is described. The code may include instructions executable by a processor to receive, from a station, uplink traffic of a traffic flow for forwarding to a backhaul network via a backhaul link, monitor a buffer of the access point to determine that a quantity of buffered uplink traffic received from the station exceeds a buffer quota, the buffer quota set for the traffic flow based on a traffic throughput capacity of the backhaul link and a throughput parameter for the traffic flow, modify, based on the quantity of buffered uplink traffic exceeding the buffer quota, an uplink communication scheme to reduce the quantity of uplink traffic from the station, and communicate with the station based on the modified uplink communication scheme.

In some examples of the method, apparatuses, and non-transitory computer-readable medium described herein, modifying the uplink communication scheme may include operations, features, means, or instructions for transmitting an indication that the station may be to pause uplink transmission.

In some examples of the method, apparatuses, and non-transitory computer-readable medium described herein, the indication that the station may be to pause uplink transmission includes an indication of a defined uplink data rate, a defined quantity of bits for an uplink burst, or both.

In some examples of the method, apparatuses, and non-transitory computer-readable medium described herein, modifying the uplink communication scheme may include operations, features, means, or instructions for transmitting an indication that the station may be to resume uplink transmission.

In some examples of the method, apparatuses, and non-transitory computer-readable medium described herein, modifying the uplink communication scheme may include operations, features, means, or instructions for transmitting, in accordance with a triggering frequency that may be reduced by the modified uplink communication scheme, an uplink transmission trigger message to trigger an uplink transmission by the station.

In some examples of the method, apparatuses, and non-transitory computer-readable medium described herein, modifying the uplink communication scheme may include operations, features, means, or instructions for transmitting an indication of a change from a first transmission opportunity duration to a second transmission opportunity duration that may have a shorter time duration than the first transmission opportunity duration, where the communicating with the station occurs during the second transmission opportunity duration.

In some examples of the method, apparatuses, and non-transitory computer-readable medium described herein, modifying the uplink communication scheme may include operations, features, means, or instructions for transmitting a negative acknowledgement message indicating that one or more successfully received uplink traffic packets were not successfully received.

In some examples of the method, apparatuses, and non-transitory computer-readable medium described herein, modifying the uplink communication scheme may include operations, features, means, or instructions for transmitting an acknowledgment for only a subset of a set of multiple medium access control protocol data units associated with a physical layer protocol data unit.

In some examples of the method, apparatuses, and non-transitory computer-readable medium described herein, modifying the uplink communication scheme may include operations, features, means, or instructions for transmitting an indication of a change from a first block acknowledgement window to a second block acknowledgement window that may have a shorter duration than the first block acknowledgement window.

In some examples of the method, apparatuses, and non-transitory computer-readable medium described herein, modifying the uplink communication scheme may include operations, features, means, or instructions for transmitting a command indicating that the station may be to disassociate with the first basic service set, where the communicating with the station includes communicating a context of the station to a second access point based on transmitting the command.

In some examples of the method, apparatuses, and non-transitory computer-readable medium described herein, modifying the uplink communication scheme may include operations, features, means, or instructions for transmitting an indication of a change from a first modulation and coding rate for uplink transmissions to a second modulation and coding rate for uplink transmissions that may have a smaller modulation and coding rate than the first modulation and coding rate, where the communicating with the station may be performed in accordance with the second modulation and coding rate for uplink transmissions.

In some examples of the method, apparatuses, and non-transitory computer-readable medium described herein, modifying the uplink communication scheme may include operations, features, means, or instructions for refraining from transmitting one or more acknowledgement messages.

In some examples of the method, apparatuses, and non-transitory computer-readable medium described herein, modifying the uplink communication scheme may include operations, features, means, or instructions for transmitting a feedback message that includes a congestion notification.

DETAILED DESCRIPTION

In a wireless communications network, various stations (STAs) may transmit uplink data to an access point (AP) to be further transmitted over a backhaul network. However, such data may be buffered by the AP before being transmitted over the backhaul network. In some circumstances, uplink data may build up and overwhelm the buffers of the AP, causing buffer overflow and packet drops by the AP. Such buffer overflow and packet drops may cause various problems in network operation, such as abrupt actions on transmission control protocol (TCP) windows, "unfair" packet drops that affect stations that are not overloading the buffers, and waste of air resources consumed on undeliverable traffic.

To reduce or eliminate such negative effects on network operations, the AP may reduce uplink data traffic from one or more of the source STAs by establishing a buffer quota for a STA and modifying an uplink communication scheme to reduce the quantity of uplink traffic from the STA when the quantity of uplink traffic exceeds the quota. The AP may employ one or more different techniques that may reduce the amount of traffic originating from the STA. For example, the AP may reduce a triggering frequency for delegating transmission opportunities (TXOPs) to the STA and may adjust a duration of a TXOP. Additionally, or alternatively, the AP may manipulate or modify Layer 2 (L2) behavior of the STA (e.g., by transmitting error messages even when messages are successfully received). Additionally, or alternatively, the AP may force the STA to associated with a different basic service set (BSS), thereby redirecting the STA's uplink traffic elsewhere.

In this way, the AP may reduce the amount of uplink traffic to meet the buffer quota, the AP may reduce or avoid adverse effects on network operations, such as buffer overflow, dropped packets, "unfair" data being dropped (e.g., when packets from a first device are dropped due to an overload or other adverse effect caused by a second device). By reducing the amount of uplink traffic to meet or satisfy the buffer quota, the AP may reduce the strain or backup on traffic directed to the backhaul network, allowing the uplink transmissions to be successfully transmitted from the STAs to the AP and subsequently to the backhaul network without excessive buffering, loss of data, wasted air resources, and other negative effects that may occur.

Figure 1:
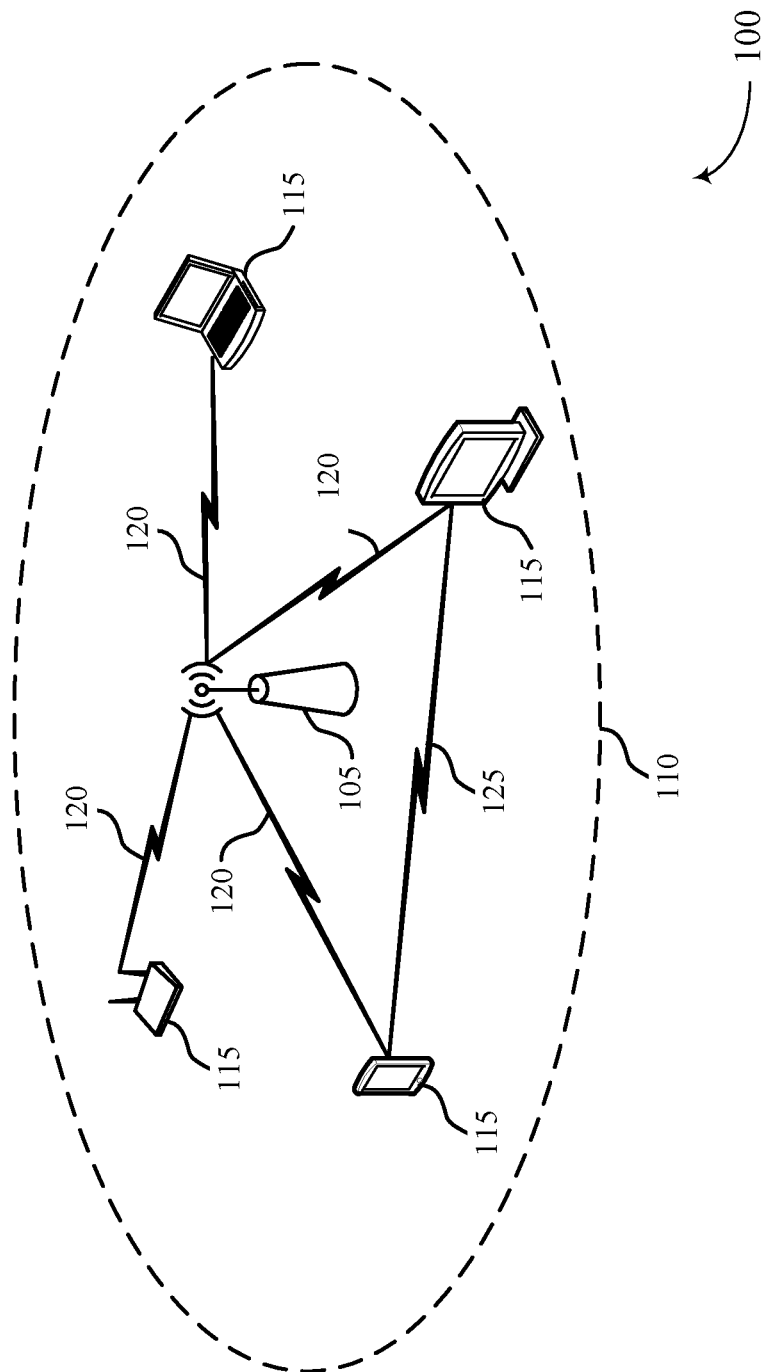
FIG. 1 illustrates an example of a wireless communications system that supports uplink flow control in accordance with examples as disclosed herein.

Aspects of the disclosure are initially described in the context of a wireless communications system. Aspects of the disclosure are then described with reference to a wireless communications system and a process flow. Aspects of the disclosure are further illustrated by and described with reference to apparatus diagrams, system diagrams, and flowcharts that relate to uplink flow control FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

For example, the AP 105 may receive uplink traffic from one or more STAs 115 and the AP 105 may keep track of an amount of uplink traffic that is buffered from the STAs 115 individually, collectively, or both. In the course of operation, the AP 105 may buffer traffic from the one or more STAs 115. If an amount of buffered uplink traffic from one STA 115, for example, exceeds a threshold amount, the AP 105 may perform one or more operations to regulate the uplink data arrival from the client or may otherwise regulate the amount of uplink traffic arriving at the AP 105 from the STA 115. In some examples, the threshold amount may also be referred to as a quota and such a threshold amount or quota may be associated with or based on one or more parameters, measurements, characteristics, metrics, or other information associated with the wireless communications network. In this way, the AP 105 may manage the uplink traffic from one or more STAs 115 in situations in which buffered data cannot all be delivered (e.g., from the AP 105 to a backhaul network to a backhaul network link) and buffered data accumulates at the AP 105.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
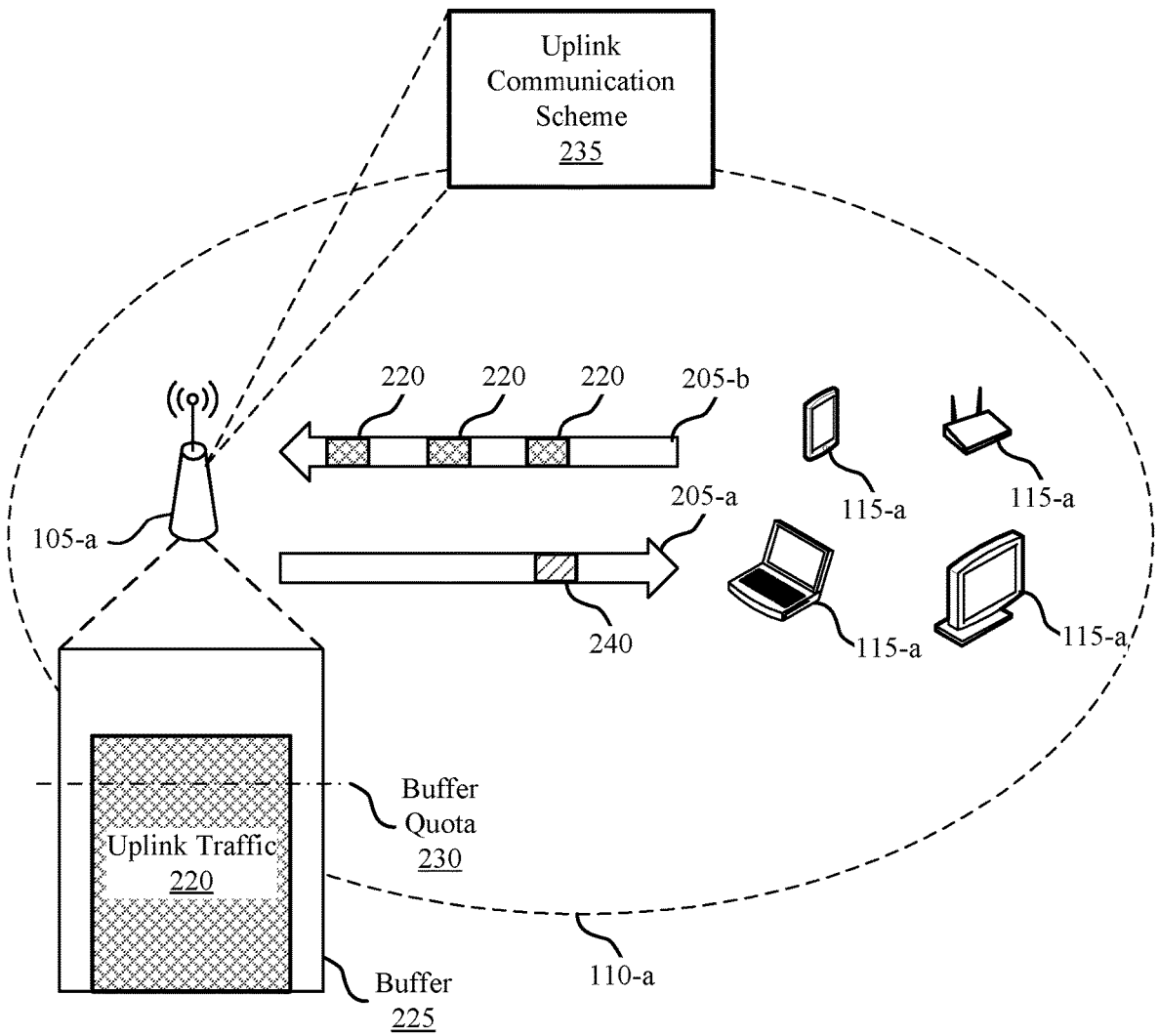
FIG. 2 illustrates an example of a wireless communications system that supports uplink flow control in accordance with one or more examples as disclosed herein.

FIG. 2 illustrates an example of a wireless communications system 200 that supports uplink flow control in accordance with one or more examples as disclosed herein. The wireless communications system 200 may include the AP 105-a and one or more STAs 115-a. In some examples, the STAs 115-a may be located in a geographic coverage area 110-a that may be associated with the AP 105-a. The AP 105-a and STA 115-a may communicate via one or more downlink communication links 205-a and one or more uplink communication links 205-b.

In the course of operations, an AP 105-a and one or more STAs 115-a may operate using an uplink communication scheme 235 that may define or regulate one or more operations for uplink communications. In some examples, during the course of operations in the uplink communication scheme 235, an uplink capacity of a basic service set (BSS) associated with the AP 105-a may be higher than an uplink capacity of an associated backhaul network, which may occur whether the backhaul network is wired or wireless. In such a case, the data received by the AP 105-a may overwhelm the uplink buffer 225, which may cause buffer overflow, packet drops, abrupt actions on TCP windows, "unfair" packet drops (e.g., in which packets from a STA 115-a are dropped even though another STA 115-a may have overwhelmed the buffer), wasted air resources that are occupied by transmissions that are undeliverable, one or more other issues, or any combination thereof. As such, it may be advantageous to address such issues at points closer to the source or sources of the uplink data generation, such as at the various STAs 115-a instead of at the AP 105-a.

In some examples, as part of the uplink communication scheme 235, the AP 105-a may employ one or more buffers 225. In some examples, the AP 105-a may employ a buffer 225 for receiving and storing uplink traffic 220 until the uplink traffic 220 may be transmitted (e.g., via the backhaul network). In some examples, a buffer 225 may be established on a per-STA basis or on a per-flow basis and in other examples, traffic from multiple STAs 115-a may be stored in a single buffer 225. For example, the AP 105-a may store the uplink traffic 220 in the buffer 225 and may establish a buffer quota 230 associated with the buffer 225 (e.g., in accordance with the uplink communication scheme 235). The buffer quota 230 may indicate an amount of uplink traffic 220 above which the AP 105-a may engage in one or more operations to manage or regulate the uplink traffic 220. Further, the AP 105-a may establish the buffer quota 230 based on one or more factors. For example, the buffer quota 230 may be based on or proportional to an uplink throughput rate (e.g., a physical layer (PHY) rate), a minimum throughput amount, an airtime fairness (ATF) value or percentage, a system delay value, one or more other parameters or values to which the flows or packets thereof may be subject, or any combination thereof. In some examples, the AP 105-*a* may determine whether the amount of uplink traffic 220 satisfies the buffer quota 230 or other threshold. As used herein, "satisfying a threshold" (e.g., satisfying the buffer quota 230) may, depending on the context, refer to a value being greater than the threshold, greater than or equal to the threshold, less than the threshold, less than or equal to the threshold, equal to the threshold, not equal to the threshold, or the like.

In the event that an amount of buffered uplink traffic 220 meets or exceeds the buffer quota 230 (e.g., at the entry to the uplink backhaul network uplink link) the AP 105-*a* may engage in one or more operations to regulate or manage the delivery of the uplink traffic 220 to the AP 105-*a* which may include one or more modifications, changes, additions, deletions, or other operations performed on or in the uplink communication scheme 235. In some examples, the AP 105-*a* may transmit an uplink communication scheme modification message 240 as part of one or more such operations. The uplink communication scheme modification message 240 may include one or more commands, indications, or information associated with the one or more operations for managing or reducing the delivery of the uplink traffic 220 to the AP 105-*a*. Different approaches or techniques are described herein and these techniques may be used in isolation or in any combination. Further, the AP 105-*a* may employ different techniques based on network conditions, characteristics of the STAs 115-*a*, or one or more other factors.

In some examples, the AP 105-*a* may modify the uplink communication scheme 235 and engage in one or more operations that may reduce a triggering frequency for the uplink transmissions or may pause one or more uplink basic triggers. In some examples, such operations may include transmitting an associated indication or command (e.g., in the uplink communication scheme modification message 240) to the STA 115-*a* for reducing the uplink triggering frequency or pausing uplink basic triggers. For example, the AP 105-*a* may reduce how often the AP 105-*a* sends a trigger to the STA 115-*a* for triggering the STA 115-*a* to send uplink data, thereby resulting in the STA 115-*a* sending less uplink data to the AP 105-*a*.

In some examples, the AP 105-*a* may modify the uplink communication scheme 235 and transmit (e.g., in one or more uplink communication scheme modification messages 240) explicit pause signaling to an STA 115-*a* (e.g., either in accordance with one or more wireless communications standards or other procedures) that may instruct the STA 115-*a* to pause uplink transmissions (e.g., for a designated time period or until receiving a resume command), which may be associated with uplink single user (SU) transmissions. In some examples, the AP 105-*a* may also transmit explicit resume signaling that may instruct the STA 115-*a* to resume uplink transmissions (e.g., once an amount of uplink traffic 220 stored in the buffer 225 has fallen below the buffer quota 230). In some examples, the pause signaling, resume signaling, or both may include one or more parameters in accordance with which the STA 115-*a* is to operate, including a maximum uplink data rate, a maximum quantity of bytes for uplink bursts or repetitions, or any combination thereof.

In some examples, the AP 105-*a* may modify the uplink communication scheme 235 and engage in one or more operations that may manipulate block acknowledgment (BA) behavior (e.g., level 2 (L2) BA behavior) that may augment the STA's UL transmissions. For example, the AP 105-*a* may introduce an artificial packet error rate (PER) to one or more STAs (e.g., using an identifier for the STA) for specific one or more PHY data rates by transmitting a BA failure or block acknowledgment (BACK) to force the STA to reduce its uplink SU PHY rate. Additionally, or alternatively, the AP 105-*a* may acknowledge one or more medium access control (MAC) protocol data units (MPDUs) (e.g., by transmitting an acknowledgement (ACK) message for one or more of the MPDUs to the STA 115-*a*) up to a portion of a physical protocol data unit (PPDU) and may not acknowledge all MPDUs of the PPDU. By only acknowledging the subset of MPDUs (e.g., as opposed to the full set of MPDUs of the PPDU), the STA 115-*a* may determine that the MPDUs that were not acknowledged were not successfully received by the AP 105-*a* or that one or more errors occurred and the STA 115-*a* may reduce an uplink transmission rate (e.g., in an attempt to compensate for the artificially-created errors or lack of acknowledgments). Additionally, or alternatively, the AP 105-*a* may renegotiate with the STA 115-*a* using a smaller BA window. By changing from a larger BA window to a smaller BA window, the AP 105-*a* may force the STA 115-*a* to transmit a smaller quantity of MPDUs to the AP 105-*a*, thereby reducing the amount of uplink traffic 220 received by the AP 105-*a* from the STA 115-*a*. In some examples, such operations may include transmitting an associated indication or command (e.g., in the uplink communication scheme modification message 240) to the STA 115-*a* for modifying or manipulating BA behavior as described herein.

In some examples, the AP 105-*a* may modify the uplink communication scheme 235 and engage in one or more operations that may force or command the STA 115-*a* to move to a different BSS. For example, the AP 105-*a* may employ one or more forced roaming commands or multi-link operation (MLO) traffic identifier (TID) to link mapping (T2LM or TLM) to force the STA 115-*a* to associate with a different BSS. By forcing the STA 115-*a* to associated with a different BSS, the amount of buffered uplink traffic 220 may be reduced since uplink traffic 220 that may have been transmitted to the AP 105-*a* and may have continued filling the buffer 225 is now transmitted elsewhere, thereby reducing the load of uplink traffic 220 on the buffer 225 in efforts to meet or satisfy the buffer quota 230 (e.g., with a level of uplink traffic 220 that is lower than the buffer quota 230). In some examples, such operations may include transmitting an associated indication or command (e.g., in the uplink communication scheme modification message 240) to the STA 115-*a* for forcing the STA 115-*a* to associate with another BSS.

In some examples, the AP 105-*a* may engage in one or more operations that may reduce a downlink transmit power of the AP 105-*a* (optionally below a transmit power level indicated or advertised in a beacon transmission). The STA 115-*a* may interpret or determine that the discrepancy between the actual received downlink transmit power and the indicated or advertised downlink transmit power indicates that a corresponding uplink link would face a similar discrepancy and may adjust one or more uplink transmission parameters (e.g., lower an uplink data transmission rate, lower an amount of data being transmitted, or other reduction in uplink transmissions) to compensate for the perceived weak uplink link.

In some examples, the AP 105-*a* may modify the uplink communication scheme 235 and engage in one or more operations that may modify an existing modulation and coding scheme (MCS) or select a different MCS to reduce the uplink data rate. For example, by selecting a different MCS (e.g., that may be associated with a different or lower data rate) the amount of uplink traffic 220 that may be transmitted by the STA 115-a may be changed (e.g., lowered) since different MCSs may allow for different modulation and coding rates. If the AP 105-a selects an MCS with a lower data rate, the STA 115-a then transmits uplink transmission in accordance with the newly-selected MCS, which may include transmitting the uplink transmissions using a different or lowered modulation and coding rate. In some examples, such operations may include transmitting an associated indication or command (e.g., in the uplink communication scheme modification message 240) to the STA 115-a for modifying an MCS or selecting a different MCS to reduce the UL data rate.

In some examples, the AP 105-a may modify the uplink communication scheme 235 and engage in one or more operations that may drop one or more downlink TCP ACK messages to reduce uplink TCP data traffic. For example, the AP 105-a may otherwise respond with a ACK that indicates that the AP 105-a has successfully received a transmission. However, in some cases where the uplink data 220 exceeds the buffer quota 230, the AP 105-a may not transmit one or more ACKs, even though the AP 105-a did successfully receive the ACK. The STA 115-a may interpret the lack of received ACKs as an indication that one or more uplink transmissions were not received by the AP 105-a and may adjust one or more uplink transmission parameters (e.g., an uplink data rate) in an attempt to compensate for the perceived loss of transmissions, thereby reducing the amount of uplink traffic 220 buffered at the AP 105-a. Additionally, or alternatively, the AP 105-a may reduce a rate of transmission of downlink TCP ACK messages, which may similarly reduce the uplink data rate for similar reasons as those explained for dropping the downlink TCP ACK messages.

In some examples, the AP 105-a may modify the uplink communication scheme 235 and engage in one or more operations that may mark one or more downlink TCP ACK messages with an explicit congestion notification (ECN) code to reduce uplink TCP data traffic. For example, the AP 105-a may otherwise respond with a ACK that indicates that the AP 105-a has successfully received a transmission and may not indicate any congestion (e.g., since, for example, no congestion may be present). However, in some cases where the uplink data 220 exceeds the buffer quota 230, the AP 105-a may "artificially" mark one or more ACKs with an ECN code, even though one or more conditions for otherwise triggering inclusion of an ECN code may not be satisfied. The STA 115-a may interpret an ECN marked ACK as an indication that the AP 105-a is experiencing a congestion condition and may adjust one or more uplink transmission parameters (e.g., an uplink data rate) in an attempt to compensate for the congestion, thereby reducing the amount of uplink traffic 220 buffered at the AP 105-a.

In some examples, the AP 105-a may modify the uplink communication scheme 235 and engage in one or more operations that may drop one or more uplink TCP ACK messages to reduce uplink TCP ACK messages from the STA 115-a that may contribute towards the uplink traffic 220 exceeding the buffer quota 230. For example, by dropping an uplink ACK message received from the STA 115-a, the STA 115-a may reduce a transmission rate of uplink TCP ACK messages, thereby reducing a quantity of uplink traffic 220 received at the AP 105-a from the STA 115-a.

Similarly, the AP 105-a may modify the uplink communication scheme 235 and engage in one or more operations that may mark one or more uplink TCP ACK messages with an ECN code to reduce a quantity of uplink TCP ACK messages from the STA 115-a that may contribute towards the uplink traffic 220 exceeding the buffer quota 230. For example, if the AP 105-a marks one or more uplink ACK messages received from the STA 115-a with ECN codes, the STA 115-a may determine that the uplink ACK messages are causing congestion at the AP 105-a and may reduce a transmission rate of uplink TCP ACK messages, thereby reducing the amount of uplink traffic 220 received at the AP 105-a.

Figure 3:
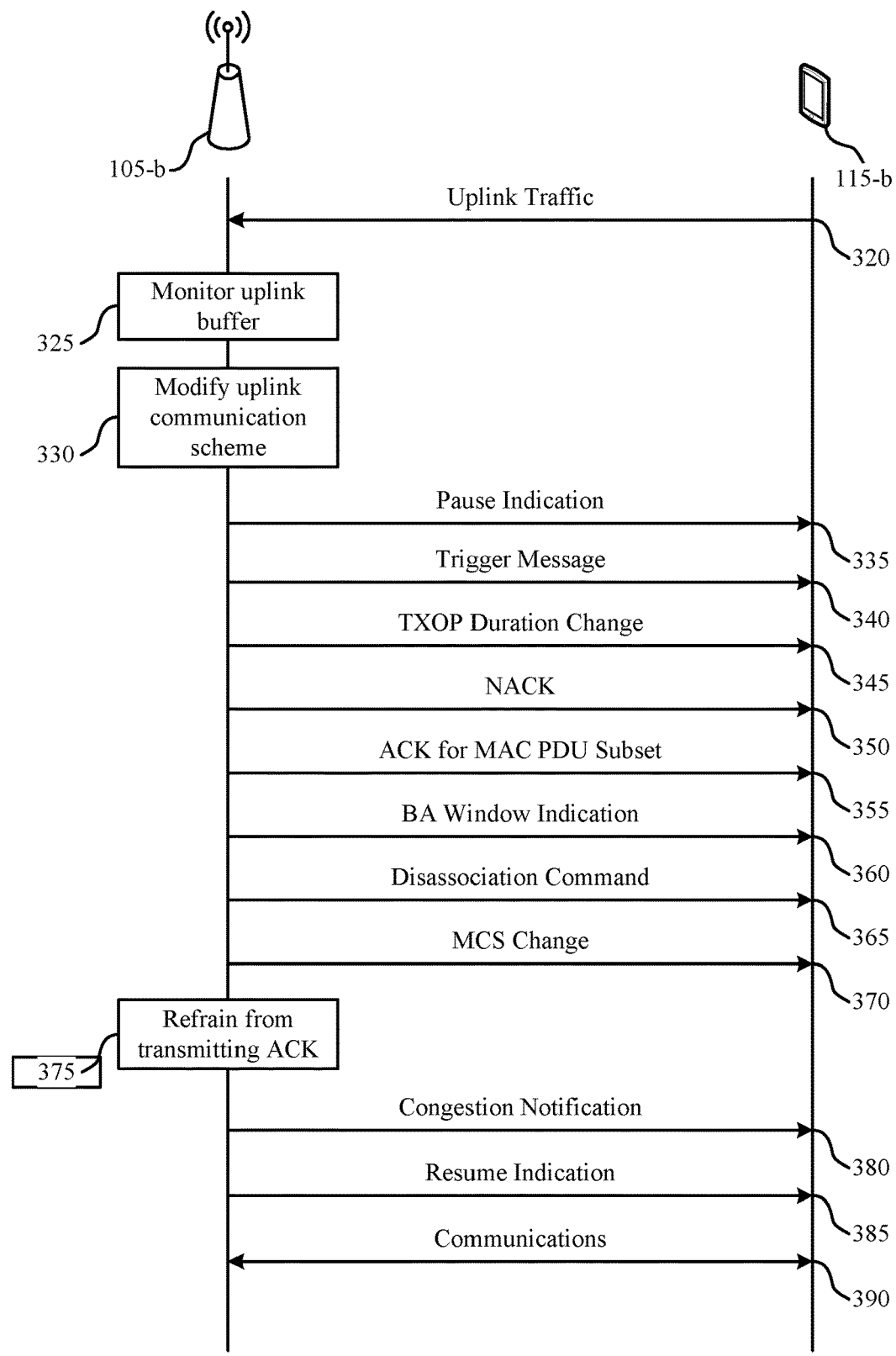
FIG. 3 illustrates an example of a process flow that supports uplink flow control in accordance with one or more examples as disclosed herein.

FIG. 3 illustrates an example of a process flow 300 that supports uplink flow control in accordance with one or more examples as disclosed herein. The process flow 300 may implement various aspects of the present disclosure described herein. The elements described in the process flow 300 may be examples of similarly-named elements described herein.

In the following description of the process flow 300, the operations between the various entities or elements may be performed in different orders or at different times. Some operations may also be left out of the process flow 300, or other operations may be added. Although the various entities or elements are shown performing the operations of the process flow 300, some aspects of some operations may also be performed by other entities or elements of the process flow 300 or by entities or elements that are not depicted in the process flow, or any combination thereof.

At 320, the AP 105-b may receive, from a station, uplink traffic of a traffic flow for forwarding to a backhaul network via a backhaul link.

At 325, the AP 105-b may monitor a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The traffic throughput capacity may indicate a quantity of data that the AP 105-b may forward to a backhaul network over a link during a certain amount of time. The throughput parameter may include or indicate one or more characteristics or behaviors of the AP 105-b relating to the throughput of data flowing through the AP 105-b. For example, such a parameter may be a PHY rate, and the AP 105-a may set the buffer quota based at least in part on (e.g., proportional to) the PHY rate. Additional throughput parameters may include a minimum throughput for data from the STA 115-b (e.g., to which the AP 105-a has committed), an ATF percentage for the STA 115-b (e.g., to which the AP 105-a has committed), a system delay for the STA 115-b (e.g., to which the AP 105-a has committed), one or more other throughput parameters, or any combination thereof. In some examples, a service, a STA, or both may be permitted by the AP 105-a to send an uplink traffic flow at a transmission rate. Further, a single STA may be permitted to have one or more traffic flows.

At 330, the AP 105-b may modify, based on the quantity of buffered uplink traffic exceeding the buffer quota, an uplink communication scheme to reduce the quantity of uplink traffic from the station.

Steps 335 through 385 here depict different options that the AP 105-b may apply to modify the uplink communication scheme to control the amount of uplink traffic provided by the STA 115-b and avoid overflowing a buffer of the AP 105-b. Such options, techniques, or approaches may be used individually or in any combination and may be performed in any order.

At 335, the AP 105-b may transmit an indication that the station is to pause uplink transmission. In some examples, the indication that the station is to pause uplink transmission comprises an indication of a defined uplink data rate, a defined quantity of bits for an uplink burst, or both.

At 340, the AP 105-b may transmit, in accordance with a triggering frequency that is reduced by the modified uplink communication scheme, an uplink transmission trigger message to trigger an uplink transmission by the station.

At 345, the AP 105-b may transmit an indication of a change from a first transmission opportunity duration to a second transmission opportunity duration that has a shorter time duration than the first transmission opportunity duration and the communicating with the station occurs during the second transmission opportunity duration.

At 350, the AP 105-b may transmit a negative acknowledgment message indicating that one or more successfully received uplink traffic packets were not successfully received. The AP 105-b may do so even if conditions for transmitting a negative acknowledgment would not otherwise be satisfied.

At 355, the AP 105-b may transmit an acknowledgment for only a subset of a plurality of medium access control protocol data units associated with a physical layer protocol data unit. The AP 105-b may do so even if conditions for transmitting an acknowledgment for a larger subset or the entirety of the plurality of medium access control protocol data units would otherwise be satisfied.

At 360, the AP 105-b may transmit an indication of a change from a first block acknowledgment window to a second block acknowledgment window that has a shorter duration than the first block acknowledgment window.

At 365, the AP 105-b may transmit a command indicating that the station is to disassociate with the first basic service set and the communicating with the station comprises communicating a context of the station to a second access point based on transmitting the command.

At 370, the AP 105-b may transmit an indication of a change from a first modulation and coding rate for uplink transmissions to a second modulation and coding rate for uplink transmissions that has a smaller modulation and coding rate than the first modulation and coding rate and the communicating with the station is performed in accordance with the second modulation and coding rate for uplink transmissions.

At 375, the AP 105-b may refrain from transmitting one or more acknowledgment messages. For example, the AP 105-b may not transmit an acknowledgment message for one or more messages or transmissions even though the AP 105-b may have successfully received the one or more messages or transmissions.

At 380, the AP 105-b may transmit a feedback message that comprises a congestion notification. For example, the AP 105-b may transmit the congestion notification even if communications conditions would not otherwise trigger a congestion notification.

At 385, the AP 105-b may transmit an indication that the station is to resume uplink transmission. For example, if the amount of buffered uplink transmissions falls below the quota for the STA 115-b after having exceeded the quota, the AP 105-b may transmit the indication to advise the STA 115-b that the STA 115-b may resume uplink transmissions.

At 390, the AP 105-b may communicate with the station based on the modified uplink communication scheme. In some examples, such communication may include a reduced amount of uplink transmissions (e.g., in situations in which uplink transmissions from the STA 115-b are being regulated or modified by the AP 105-b using techniques described herein).

Figure 4:
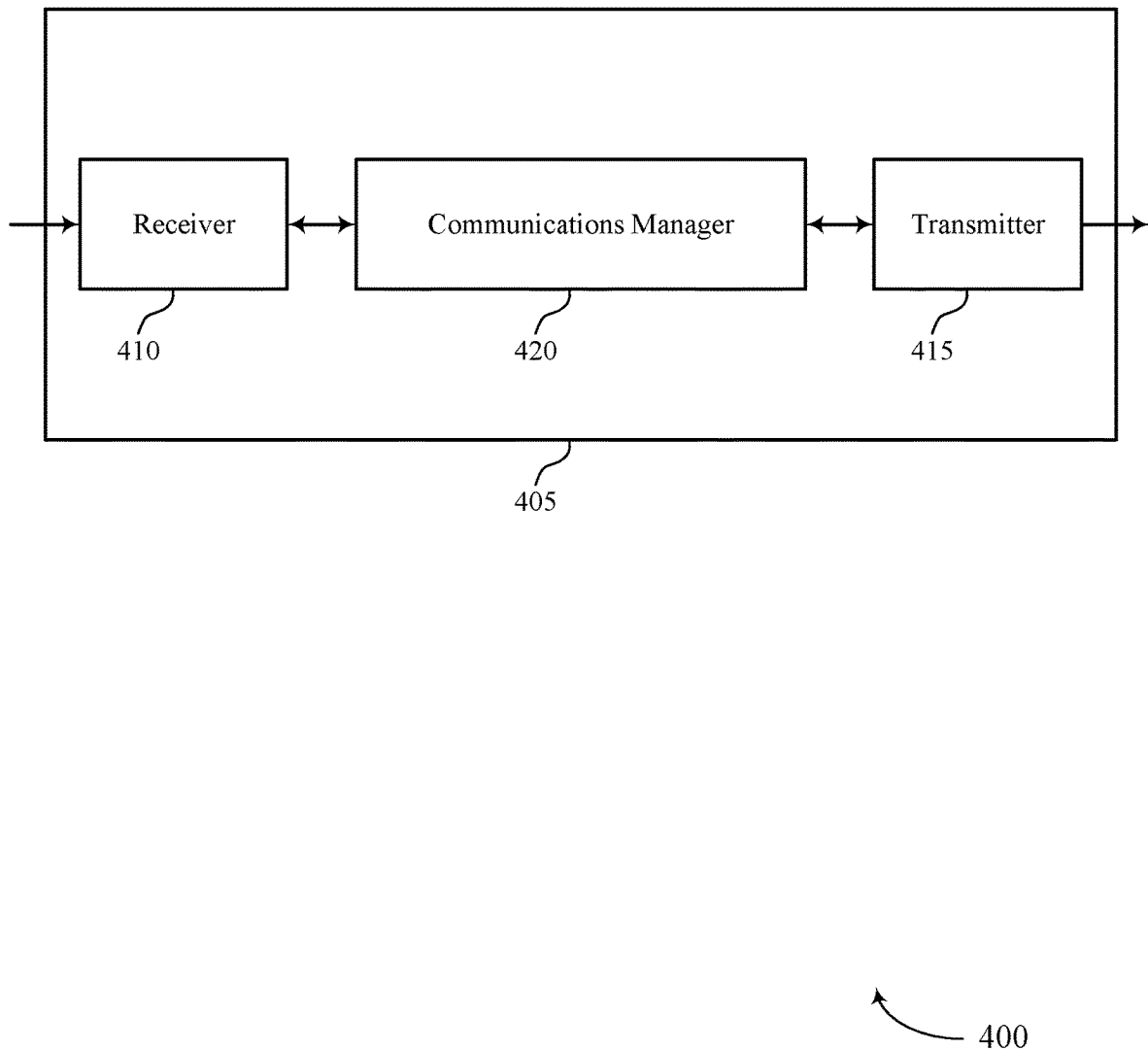
FIGS. 4 and 5 show block diagrams of devices that support uplink flow control in accordance with one or more examples as disclosed herein.

FIG. 4 shows a block diagram 400 of a device 405 that supports uplink flow control in accordance with one or more examples as disclosed herein. The device 405 may be an example of aspects of an AP as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to uplink flow control). Information may be passed on to other components of the device 405. The receiver 410 may utilize a single antenna or a set of multiple antennas.

The transmitter 415 may provide a means for transmitting signals generated by other components of the device 405. The transmitter 415 may utilize a single antenna or a set of multiple antennas.

The communications manager 420, the receiver 410, the transmitter 415, or various combinations thereof or various components thereof may be examples of means for performing various aspects of uplink flow control as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

Additionally, or alternatively, the communications manager 420 may support wireless communications at an access point in accordance with examples as disclosed herein. For example, the communications manager 420 may be configured as or otherwise support a means for receiving, from a station, uplink traffic of a traffic flow for forwarding to a backhaul network via a backhaul link. The communications manager 420 may be configured as or otherwise support a means for monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The communications manager 420 may be configured as or otherwise support a means for modifying, based on the quantity of buffered uplink traffic exceeding the buffer quota, an uplink communication scheme to reduce the quantity of uplink traffic from the station. The communications manager 420 may be configured as or otherwise support a means for communicating with the station based on the modified uplink communication scheme.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, more efficient utilization of communication resources, or any combination thereof.

Figure 5:
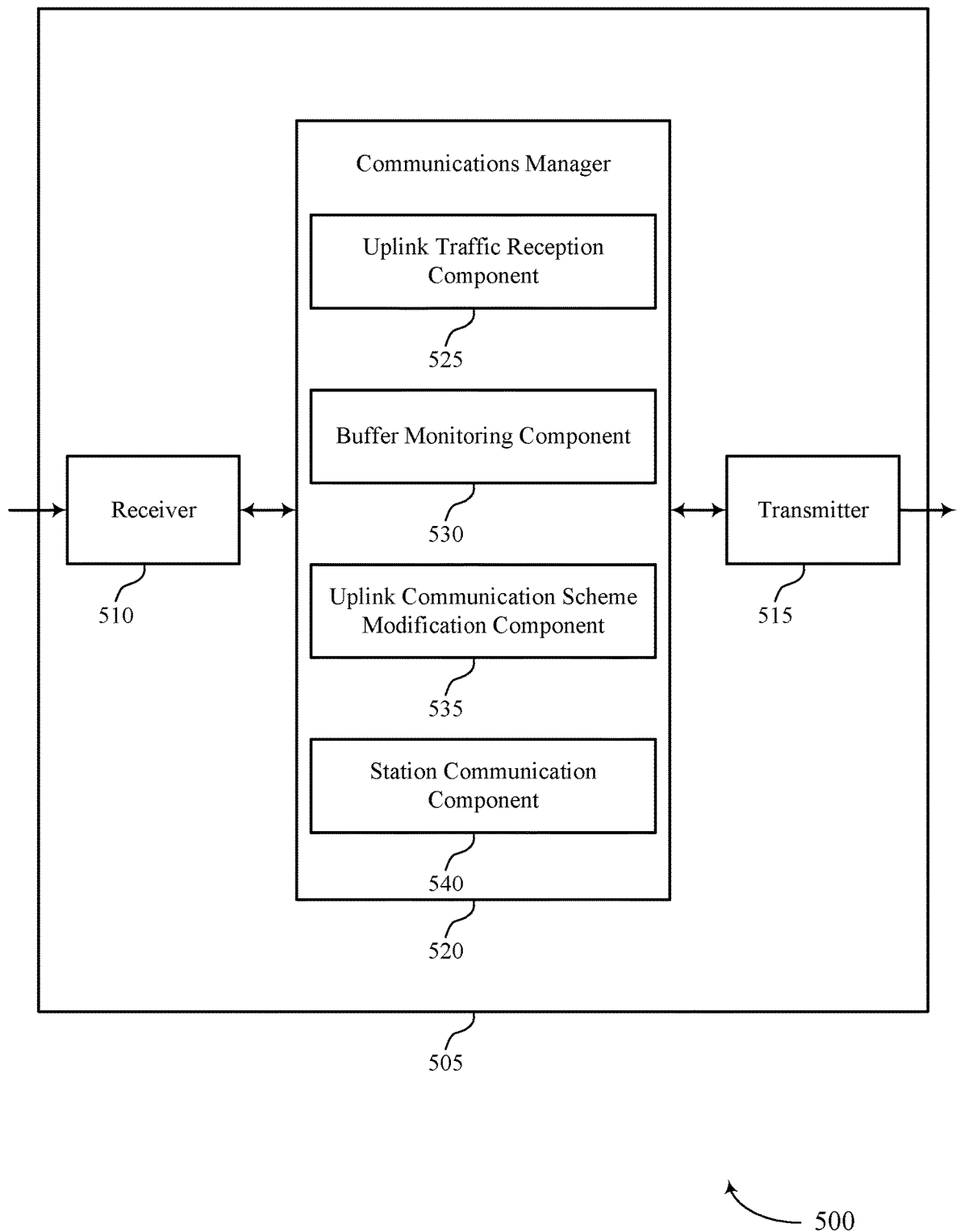

FIG. 5 shows a block diagram 500 of a device 505 that supports uplink flow control in accordance with one or more examples as disclosed herein. The device 505 may be an example of aspects of a device 405 or an AP 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink flow control). Information may be passed on to other components of the device 505. The receiver 510 may utilize a single antenna or a set of multiple antennas.

The transmitter 515 may provide a means for transmitting signals generated by other components of the device 505. The transmitter 515 may utilize a single antenna or a set of multiple antennas.

The device 505, or various components thereof, may be an example of means for performing various aspects of uplink flow control as described herein. For example, the communications manager 520 may include an uplink traffic reception component 525, a buffer monitoring component 530, an uplink communication scheme modification component 535, a station communication component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at an access point in accordance with examples as disclosed herein. The uplink traffic reception component 525 may be configured as or otherwise support a means for receiving, from a station, uplink traffic of a traffic flow for forwarding to a backhaul network via a backhaul link. The buffer monitoring component 530 may be configured as or otherwise support a means for monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The uplink communication scheme modification component 535 may be configured as or otherwise support a means for modifying, based on the quantity of buffered uplink traffic exceeding the buffer quota, an uplink communication scheme to reduce the quantity of uplink traffic from the station. The station communication component 540 may be configured as or otherwise support a means for communicating with the station based on the modified uplink communication scheme.

Figure 6:
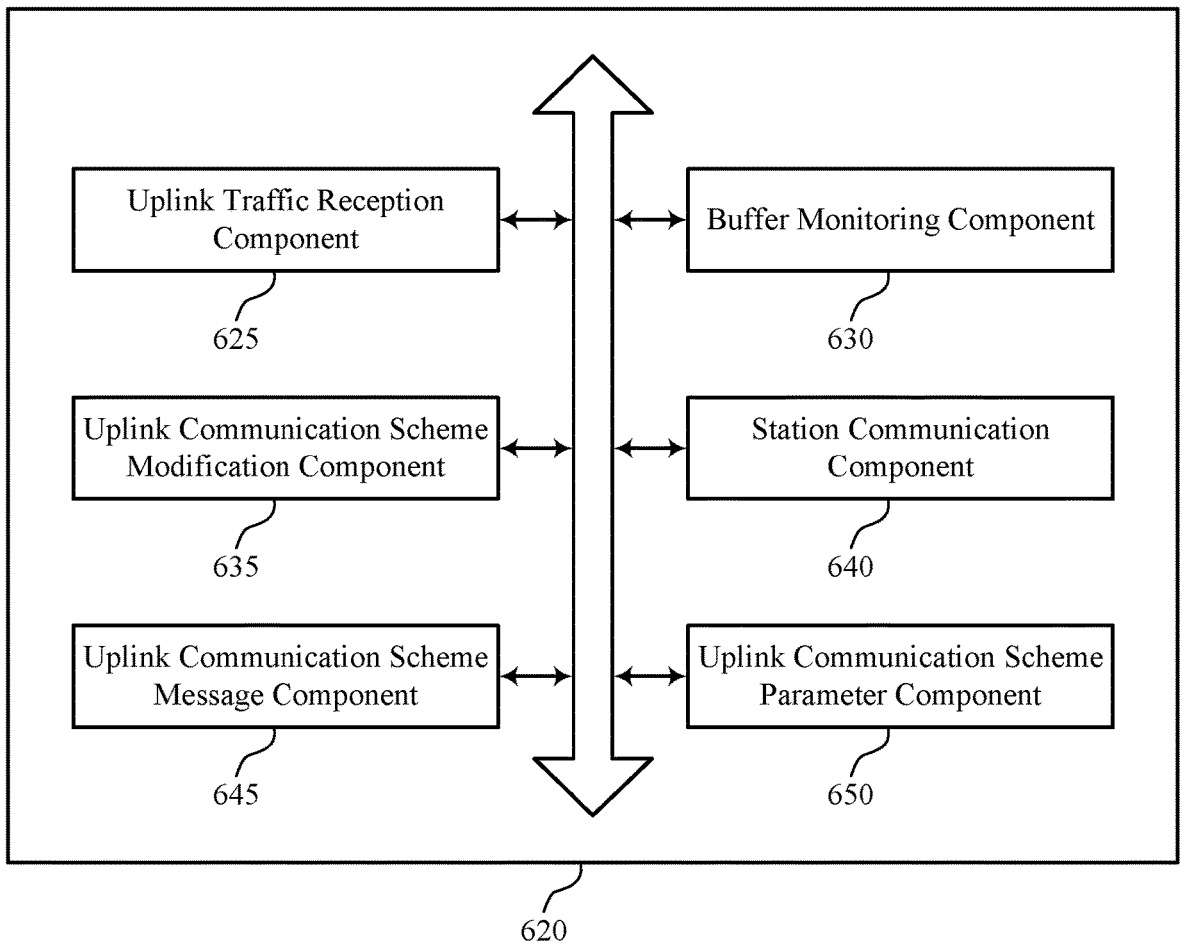
FIG. 6 shows a block diagram of a communications manager that supports uplink flow control in accordance with one or more examples as disclosed herein.

FIG. 6 shows a block diagram 600 of a communications manager 620 that supports uplink flow control in accordance with one or more examples as disclosed herein. The communications manager 620 may be an example of aspects of a communications manager 420, a communications manager 520, or both, as described herein. The communications manager 620, or various components thereof, may be an example of means for performing various aspects of uplink flow control as described herein. For example, the communications manager 620 may include an uplink traffic reception component 625, a buffer monitoring component 630, an uplink communication scheme modification component 635, a station communication component 640, an uplink communication scheme message component 645, an uplink communication scheme parameter component 650, or any combination thereof. Each of these components may communicate, directly or indirectly, with one another (e.g., via one or more buses).

Additionally, or alternatively, the communications manager 620 may support wireless communications at an access point in accordance with examples as disclosed herein. The uplink traffic reception component 625 may be configured as or otherwise support a means for receiving, from a station, uplink traffic of a traffic flow for forwarding to a backhaul network via a backhaul link. The buffer monitoring component 630 may be configured as or otherwise support a means for monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The uplink communication scheme modification component 635 may be configured as or otherwise support a means for modifying, based on the quantity of buffered uplink traffic exceeding the buffer quota, an uplink communication scheme to reduce the quantity of uplink traffic from the station. The station communication component 640 may be configured as or otherwise support a means for communicating with the station based on the modified uplink communication scheme.

In some examples, to support modifying the uplink communication scheme, the uplink communication scheme message component 645 may be configured as or otherwise support a means for transmitting an indication that the station is to pause uplink transmission.

In some examples, the indication that the station is to pause uplink transmission includes an indication of a defined uplink data rate, a defined quantity of bits for an uplink burst, or both.

In some examples, to support modifying the uplink communication scheme, the uplink communication scheme message component 645 may be configured as or otherwise support a means for transmitting an indication that the station is to resume uplink transmission.

In some examples, to support modifying the uplink communication scheme, the uplink communication scheme message component 645 may be configured as or otherwise support a means for transmitting, in accordance with a triggering frequency that is reduced by the modified uplink communication scheme, an uplink transmission trigger message to trigger an uplink transmission by the station.

In some examples, to support modifying the uplink communication scheme, the uplink communication scheme message component 645 may be configured as or otherwise support a means for transmitting an indication of a change from a first transmission opportunity duration to a second transmission opportunity duration that has a shorter time duration than the first transmission opportunity duration, where the communicating with the station occurs during the second transmission opportunity duration.

In some examples, to support modifying the uplink communication scheme, the uplink communication scheme message component 645 may be configured as or otherwise support a means for transmitting a negative acknowledgment message indicating that one or more successfully received uplink traffic packets were not successfully received.

In some examples, to support modifying the uplink communication scheme, the uplink communication scheme message component 645 may be configured as or otherwise support a means for transmitting an acknowledgment for only a subset of a set of multiple medium access control protocol data units associated with a physical layer protocol data unit.

In some examples, to support modifying the uplink communication scheme, the uplink communication scheme message component 645 may be configured as or otherwise support a means for transmitting an indication of a change from a first block acknowledgment window to a second block acknowledgment window that has a shorter duration than the first block acknowledgment window.

In some examples, to support modifying the uplink communication scheme, the uplink communication scheme message component 645 may be configured as or otherwise support a means for transmitting a command indicating that the station is to disassociate with the first basic service set, where the communicating with the station includes communicating a context of the station to a second access point based on transmitting the command.

In some examples, to support modifying the uplink communication scheme, the uplink communication scheme parameter component 650 may be configured as or otherwise support a means for transmitting an indication of a change from a first modulation and coding rate for uplink transmissions to a second modulation and coding rate for uplink transmissions that has a smaller modulation and coding rate than the first modulation and coding rate, where the communicating with the station is performed in accordance with the second modulation and coding rate for uplink transmissions.

In some examples, to support modifying the uplink communication scheme, the uplink communication scheme message component 645 may be configured as or otherwise support a means for refraining from transmitting one or more acknowledgment messages.

In some examples, to support modifying the uplink communication scheme, the uplink communication scheme message component 645 may be configured as or otherwise support a means for transmitting a feedback message that includes a congestion notification.

Figure 7:
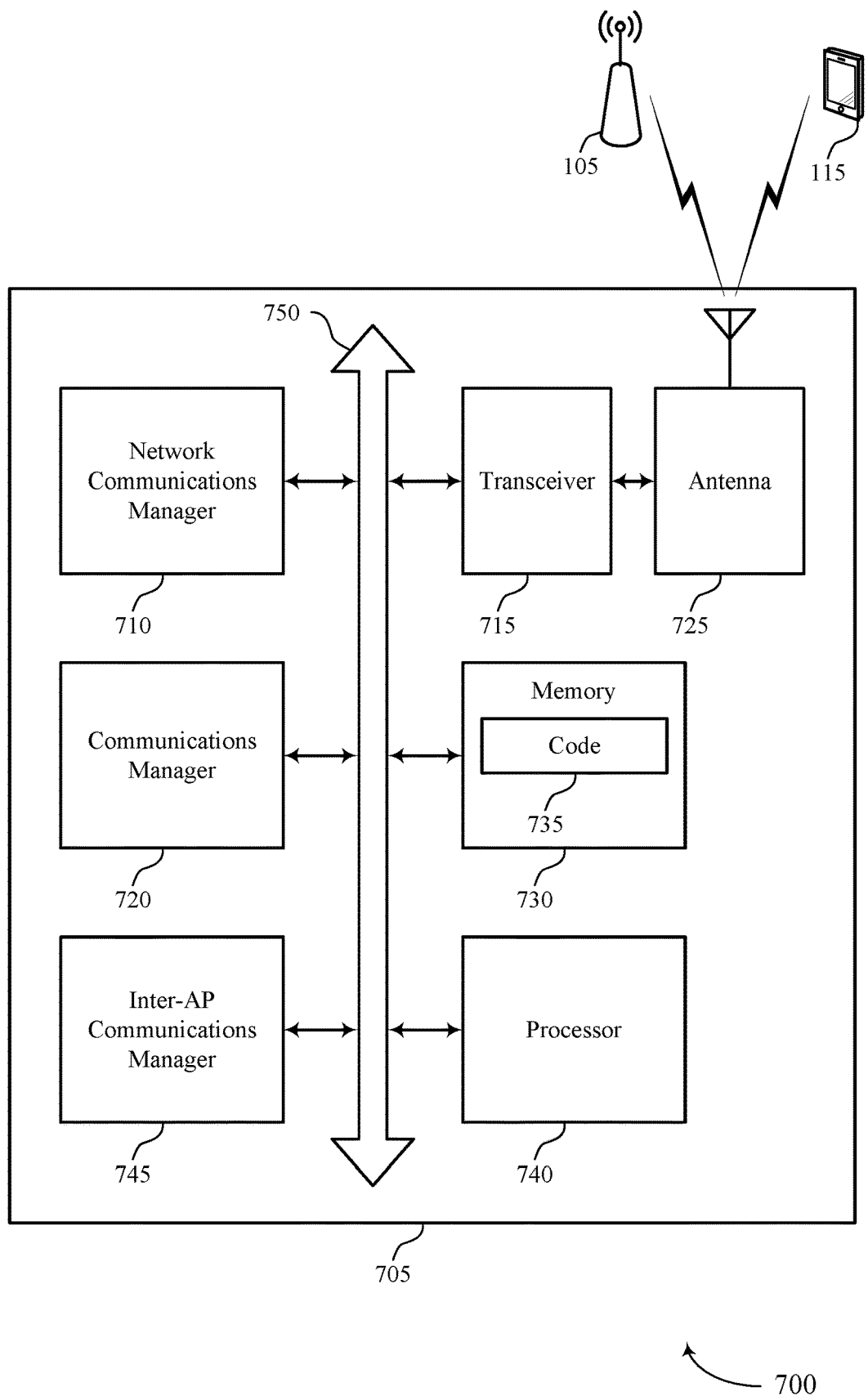
FIG. 7 shows a diagram of a system including a device that supports uplink flow control in accordance with one or more examples as disclosed herein.

FIG. 7 shows a diagram of a system 700 including a device 705 that supports uplink flow control in accordance with one or more examples as disclosed herein. The device 705 may be an example of or include the components of a device 405, a device 505, or an AP as described herein. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-AP communications manager 745. These components may be in electronic communication or otherwise coupled (e.g., operatively, communicatively, functionally, electronically, electrically) via one or more buses (e.g., a bus 750).

The network communications manager 710 may manage communications with a core network (e.g., via one or more wired backhaul links). For example, the network communications manager 710 may manage the transfer of data communications for client devices, such as one or more STAs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets and provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting uplink flow control). For example, the device 705 or a component of the device 705 may include a processor 740 and memory 730 coupled with or to the processor 740, the processor 740 and memory 730 configured to perform various functions described herein.

The inter-station communications manager 745 may manage communications with other APs 105, and may include a controller or scheduler for controlling communications with STAs 115 in cooperation with other APs 105. For example, the inter-station communications manager 745 may coordinate scheduling for transmissions to APs 105 for various interference mitigation techniques such as beamforming or joint transmission. In some examples, the inter-station communications manager 745 may provide an X2 interface within an LTE/LTE-A wireless communication network technology to provide communication between APs 105.

Additionally, or alternatively, the communications manager 720 may support wireless communications at an access point in accordance with examples as disclosed herein. For example, the communications manager 720 may be configured as or otherwise support a means for receiving, from a station, uplink traffic of a traffic flow for forwarding to a backhaul network via a backhaul link. The communications manager 720 may be configured as or otherwise support a means for monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The communications manager 720 may be configured as or otherwise support a means for modifying, based on the quantity of buffered uplink traffic exceeding the buffer quota, an uplink communication scheme to reduce the quantity of uplink traffic from the station. The communications manager 720 may be configured as or otherwise support a means for communicating with the station based on the modified uplink communication scheme.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 8:
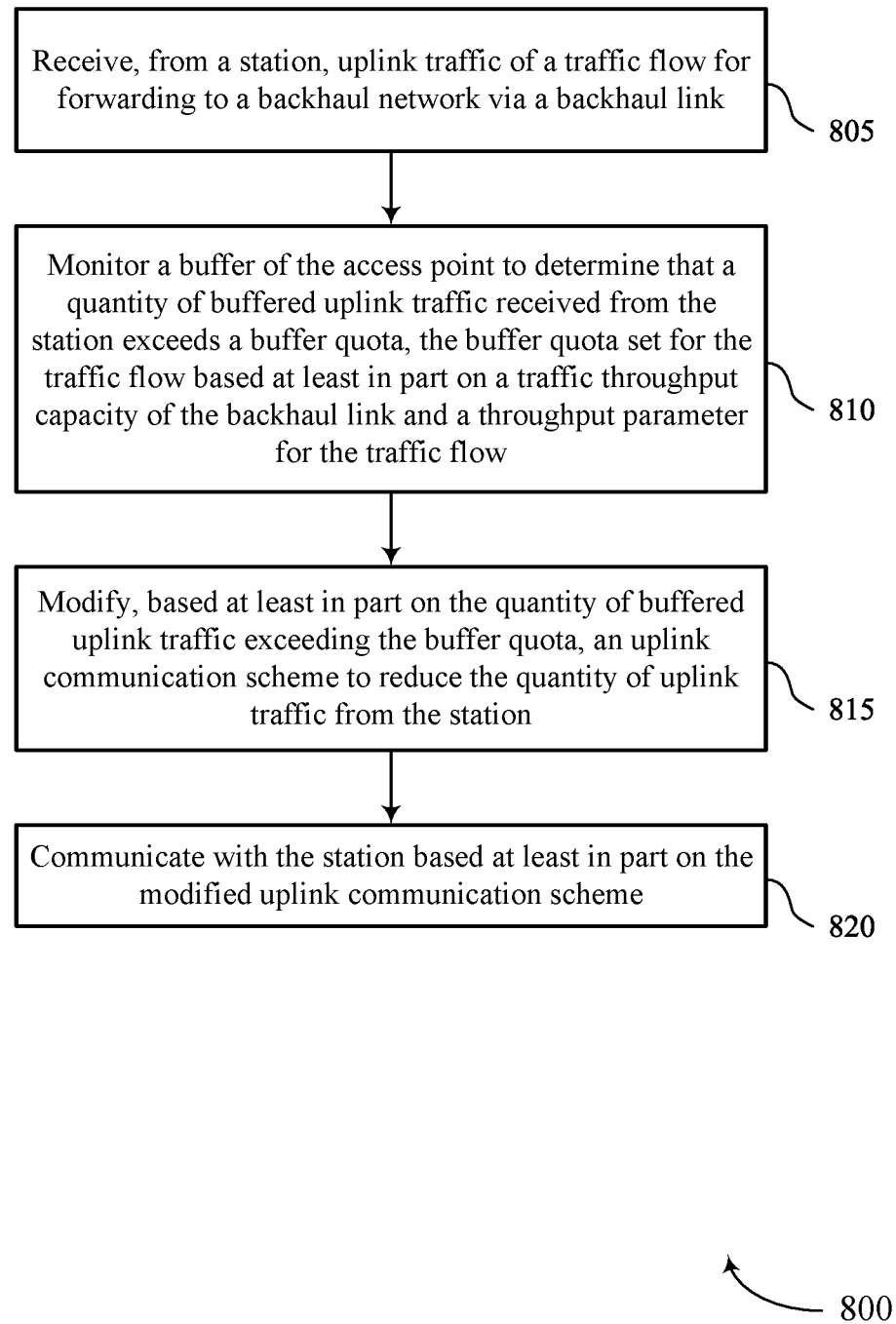
FIGS. 8 and 9 show flowcharts illustrating methods that support uplink flow control in accordance with one or more examples as disclosed herein.

FIG. 8 shows a flowchart illustrating a method 800 that supports uplink flow control in accordance with one or more examples as disclosed herein. The operations of the method 800 may be implemented by an AP or its components as described herein. For example, the operations of the method 800 may be performed by an AP as described with reference to FIGs. FIG. 1 through 7. In some examples, an AP may execute a set of instructions to control the functional elements of the AP to perform the described functions. Additionally, or alternatively, the AP may perform aspects of the described functions using special-purpose hardware.

At 805, the method may include receiving, from a station, uplink traffic of a traffic flow for forwarding to a backhaul network via a backhaul link. The operations of 805 may be performed in accordance with examples as disclosed herein. In some examples, aspects of the operations of 805 may be performed by an uplink traffic reception component 625 as described with reference to FIG. 6.

At 810, the method may include monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The operations of 810 may be performed in accordance with examples as disclosed herein. In some examples, aspects of the operations of 810 may be performed by a buffer monitoring component 630 as described with reference to FIG. 6.

At 815, the method may include modifying, based on the quantity of buffered uplink traffic exceeding the buffer quota, an uplink communication scheme to reduce the quantity of uplink traffic from the station. The operations of 815 may be performed in accordance with examples as disclosed herein. In some examples, aspects of the operations of 815 may be performed by an uplink communication scheme modification component 635 as described with reference to FIG. 6.

At 820, the method may include communicating with the station based on the modified uplink communication scheme. The operations of 820 may be performed in accordance with examples as disclosed herein. In some examples, aspects of the operations of 820 may be performed by a station communication component 640 as described with reference to FIG. 6.

Figure 9:
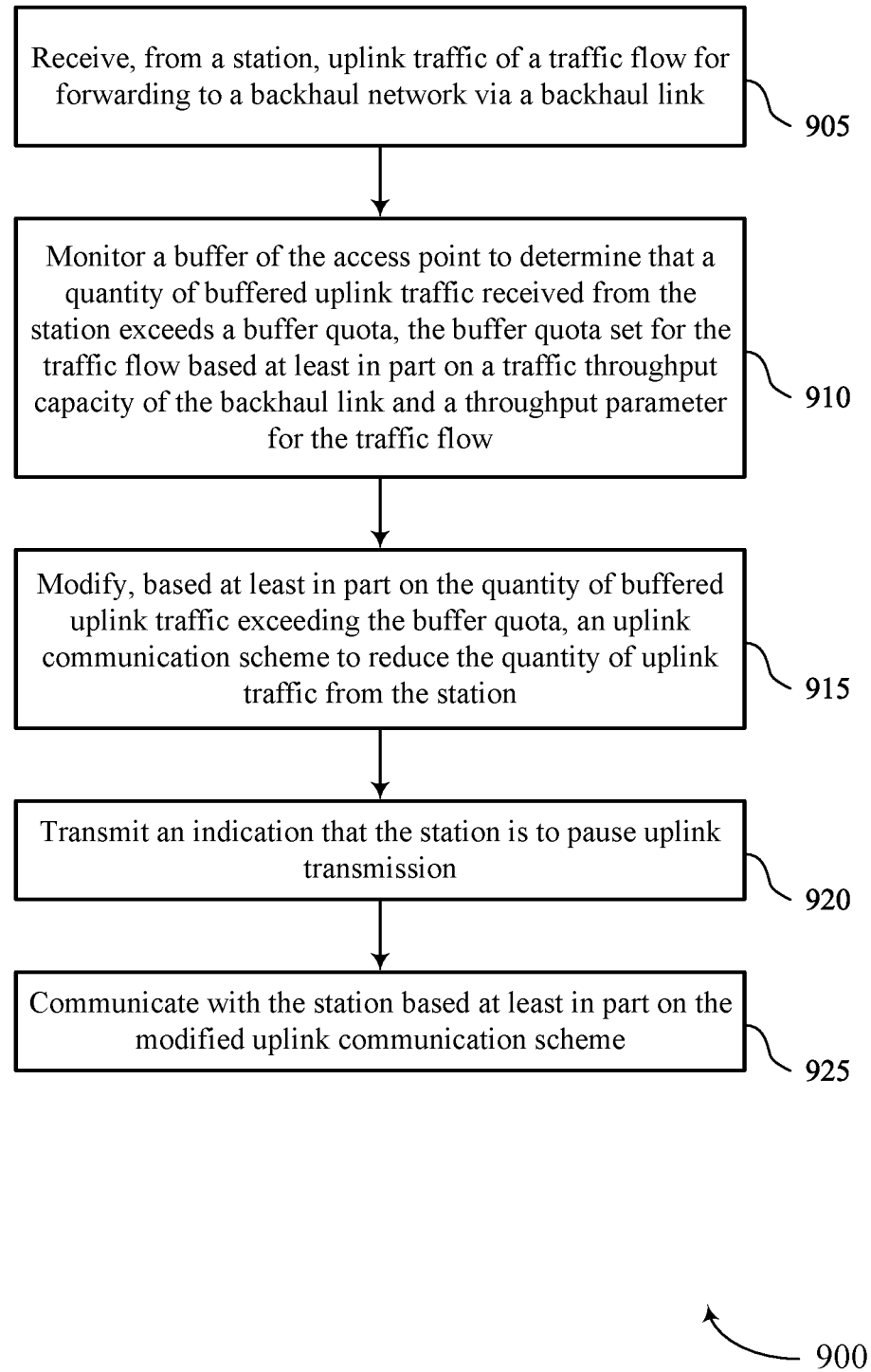

FIG. 9 shows a flowchart illustrating a method 900 that supports uplink flow control in accordance with one or more examples as disclosed herein. The operations of the method 900 may be implemented by an AP or its components as described herein. For example, the operations of the method 900 may be performed by an AP as described with reference to FIGs. FIG. 1 through 7. In some examples, an AP may execute a set of instructions to control the functional elements of the AP to perform the described functions. Additionally, or alternatively, the AP may perform aspects of the described functions using special-purpose hardware.

At 905, the method may include receiving, from a station, uplink traffic of a traffic flow for forwarding to a backhaul network via a backhaul link. The operations of 905 may be performed in accordance with examples as disclosed herein. In some examples, aspects of the operations of 905 may be performed by an uplink traffic reception component 625 as described with reference to FIG. 6.

At 910, the method may include monitoring a buffer of the access point to determine that a quantity of buffered uplink traffic received from the station exceeds a buffer quota, the buffer quota set for the traffic flow based on a traffic throughput capacity of the backhaul link and a throughput parameter for the traffic flow. The operations of 910 may be performed in accordance with examples as disclosed herein. In some examples, aspects of the operations of 910 may be performed by a buffer monitoring component 630 as described with reference to FIG. 6.

At 915, the method may include modifying, based on the quantity of buffered uplink traffic exceeding the buffer quota, an uplink communication scheme to reduce the quantity of uplink traffic from the station. The operations of 915 may be performed in accordance with examples as disclosed herein. In some examples, aspects of the operations of 915 may be performed by an uplink communication scheme modification component 635 as described with reference to FIG. 6.

At 920, the method may include transmitting an indication that the station is to pause uplink transmission. The operations of 920 may be performed in accordance with examples as disclosed herein. In some examples, aspects of the operations of 920 may be performed by an uplink communication scheme message component 645 as described with reference to FIG. 6.

At 925, the method may include communicating with the station based on the modified uplink communication scheme. The operations of 925 may be performed in accordance with examples as disclosed herein. In some examples, aspects of the operations of 925 may be performed by a station communication component 640 as described with reference to FIG. 6.

The following provides an overview of aspects of the present disclosure:

Aspect 1: A method for wireless communications at an access point, comprising: receiving, from a station, uplink traffic of a traffic flow for forwarding to a backhaul network via a backhaul link; monitoring a buffer of the access point to determine that a quantity of buffered uplink traffic received from the station exceeds a buffer quota, the buffer quota set for the traffic flow based at least in part on a traffic throughput capacity of the backhaul link and a throughput parameter for the traffic flow; modifying, based at least in part on the quantity of buffered uplink traffic exceeding the buffer quota, an uplink communication scheme to reduce the quantity of uplink traffic from the station; and communicating with the station based at least in part on the modified uplink communication scheme.

Aspect 2: The method of aspect 1, wherein modifying the uplink communication scheme comprises: transmitting an indication that the station is to pause uplink transmission.

Aspect 3: The method of aspect 2, wherein the indication that the station is to pause uplink transmission comprises an indication of a defined uplink data rate, a defined quantity of bits for an uplink burst, or both.

Aspect 4: The method of any of aspects 2 through 3, wherein modifying the uplink communication scheme further comprises: transmitting an indication that the station is to resume uplink transmission.

Aspect 5: The method of any of aspects 1 through 4, wherein modifying the uplink communication scheme comprises: transmitting, in accordance with a triggering frequency that is reduced by the modified uplink communication scheme, an uplink transmission trigger message to trigger an uplink transmission by the station.

Aspect 6: The method of any of aspects 1 through 5, wherein modifying the uplink communication scheme comprises: transmitting an indication of a change from a first transmission opportunity duration to a second transmission opportunity duration that has a shorter time duration than the first transmission opportunity duration, wherein the communicating with the station occurs during the second transmission opportunity duration.

Aspect 7: The method of any of aspects 1 through 6, wherein modifying the uplink communication scheme comprises: transmitting a negative acknowledgement message indicating that one or more successfully received uplink traffic packets were not successfully received.

Aspect 8: The method of any of aspects 1 through 7, wherein modifying the uplink communication scheme comprises: transmitting an acknowledgment for only a subset of a plurality of medium access control protocol data units associated with a physical layer protocol data unit.

Aspect 9: The method of any of aspects 1 through 8, wherein modifying the uplink communication scheme comprises: transmitting an indication of a change from a first block acknowledgement window to a second block acknowledgement window that has a shorter duration than the first block acknowledgement window.

Aspect 10: The method of any of aspects 1 through 9, wherein the access point and the station are associated with a first basic service set, wherein modifying the uplink communication scheme comprises: transmitting a command indicating that the station is to disassociate with the first basic service set, wherein the communicating with the station comprises communicating a context of the station to a second access point based at least in part on transmitting the command.

Aspect 11: The method of any of aspects 1 through 10, wherein modifying the uplink communication scheme comprises: transmitting an indication of a change from a first modulation and coding rate for uplink transmissions to a second modulation and coding rate for uplink transmissions that has a smaller modulation and coding rate than the first modulation and coding rate, wherein the communicating with the station is performed in accordance with the second modulation and coding rate for uplink transmissions.

Aspect 12: The method of any of aspects 1 through 11, wherein modifying the uplink communication scheme comprises: refraining from transmitting one or more acknowledgement messages.

Aspect 13: The method of any of aspects 1 through 12, wherein modifying the uplink communication scheme comprises: transmitting a feedback message that comprises a congestion notification.

Aspect 14: An apparatus for wireless communications at an access point, comprising a processor; memory coupled with the processor; and instructions stored in the memory and executable by the processor to cause the apparatus to perform a method of any of aspects 1 through 13.

Aspect 15: An apparatus for wireless communications at an access point, comprising at least one means for performing a method of any of aspects 1 through 13.

Aspect 16: A non-transitory computer-readable medium storing code for wireless communications at an access point, the code comprising instructions executable by a processor to perform a method of any of aspects 1 through 13.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and wireless communications system 200 of FIGS. 1 and 2 respectively—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at an access point, comprising:
   one or more processors;
   one or more memories coupled with the one or more processors; and
   instructions stored in the one or more memories and executable by the one or more processors to cause the apparatus to:
      receive, from a station, uplink traffic of a traffic flow for forwarding to a backhaul network via a backhaul link;
      monitor a buffer of the access point to determine that a quantity of buffered uplink traffic received from the station exceeds a buffer quota, the buffer quota set for the traffic flow based at least in part on a traffic throughput capacity of the backhaul link and a throughput parameter for the traffic flow, wherein the throughput parameter indicates an uplink throughput commitment by the access point to the station for the traffic flow;
      modify, based at least in part on the quantity of buffered uplink traffic exceeding the buffer quota, an uplink communication scheme to reduce the quantity of uplink traffic from the station; and
      communicate with the station based at least in part on the modified uplink communication scheme.

2. The apparatus of claim 1, wherein the instructions to modify the uplink communication scheme are executable by the one or more processors to cause the apparatus to:
   transmit an indication that the station is to pause uplink transmission.

3. The apparatus of claim 2, wherein the indication that the station is to pause uplink transmission comprises an indication of a defined uplink data rate, a defined quantity of bits for an uplink burst, or both.

4. The apparatus of claim 2, wherein the instructions to modify the uplink communication scheme are further executable by the one or more processors to cause the apparatus to:
   transmit an indication that the station is to resume uplink transmission.

5. The apparatus of claim 1, wherein the instructions to modify the uplink communication scheme are executable by the one or more processors to cause the apparatus to:
   transmit, in accordance with a triggering frequency that is reduced by the modified uplink communication scheme, an uplink transmission trigger message to trigger an uplink transmission by the station.

6. The apparatus of claim 1, wherein the instructions to modify the uplink communication scheme are executable by the one or more processors to cause the apparatus to:
   transmit an indication of a change from a first transmission opportunity duration to a second transmission opportunity duration that has a shorter time duration than the first transmission opportunity duration;
   wherein the communicating with the station occurs during the second transmission opportunity duration.

7. The apparatus of claim 1, wherein the instructions to modify the uplink communication scheme are executable by the one or more processors to cause the apparatus to:
   transmit a negative acknowledgment message indicating that one or more successfully received uplink traffic packets were not successfully received.

8. The apparatus of claim 1, wherein the instructions to modify the uplink communication scheme are executable by the one or more processors to cause the apparatus to:
   transmit an acknowledgment for only a subset of a plurality of medium access control protocol data units associated with a physical layer protocol data unit.

9. The apparatus of claim 1, wherein the instructions to modify the uplink communication scheme are executable by the one or more processors to cause the apparatus to:
   transmit an indication of a change from a first block acknowledgment window to a second block acknowledgment window that has a shorter duration than the first block acknowledgment window.

10. The apparatus of claim 1, wherein the access point and the station are associated with a first basic service set and the instructions to modify the uplink communication scheme are executable by the one or more processors to cause the apparatus to:
    transmit a command indicating that the station is to disassociate with the first basic service set;
    wherein the communicating with the station comprises communicating a context of the station to a second access point based at least in part on transmitting the command.

11. The apparatus of claim 1, wherein the instructions to modify the uplink communication scheme are executable by the one or more processors to cause the apparatus to:
    transmit an indication of a change from a first modulation and coding rate for uplink transmissions to a second modulation and coding rate for uplink transmissions that has a smaller modulation and coding rate than the first modulation and coding rate;
    wherein the communicating with the station is performed in accordance with the second modulation and coding rate for uplink transmissions.

12. The apparatus of claim 1, wherein the instructions to modify the uplink communication scheme are executable by the one or more processors to cause the apparatus to:
    refrain from transmitting one or more acknowledgment messages.

13. The apparatus of claim 1, wherein the instructions to modify the uplink communication scheme are executable by the one or more processors to cause the apparatus to:
    transmit a feedback message that comprises a congestion notification.

14. A method for wireless communications at an access point, comprising:
    receiving, from a station, uplink traffic of a traffic flow for forwarding to a backhaul network via a backhaul link;
    monitoring a buffer of the access point to determine that a quantity of buffered uplink traffic received from the station exceeds a buffer quota, the buffer quota set for the traffic flow based at least in part on a traffic throughput capacity of the backhaul link and a throughput parameter for the traffic flow, wherein the throughput parameter indicates an uplink throughput commitment by the access point to the station for the traffic flow;
    modifying, based at least in part on the quantity of buffered uplink traffic exceeding the buffer quota, an uplink communication scheme to reduce the quantity of uplink traffic from the station; and
    communicating with the station based at least in part on the modified uplink communication scheme.

15. The method of claim 14, wherein modifying the uplink communication scheme comprises:
   transmitting an indication that the station is to pause uplink transmission.

16. The method of claim 15, wherein the indication that the station is to pause uplink transmission comprises an indication of a defined uplink data rate, a defined quantity of bits for an uplink burst, or both.

17. The method of claim 15, wherein modifying the uplink communication scheme further comprises:
   transmitting an indication that the station is to resume uplink transmission.

18. The method of claim 14, wherein modifying the uplink communication scheme comprises:
   transmitting, in accordance with a triggering frequency that is reduced by the modified uplink communication scheme, an uplink transmission trigger message to trigger an uplink transmission by the station.

19. The method of claim 14, wherein modifying the uplink communication scheme comprises:
   transmitting an indication of a change from a first transmission opportunity duration to a second transmission opportunity duration that has a shorter time duration than the first transmission opportunity duration, wherein the communicating with the station occurs during the second transmission opportunity duration.

20. The method of claim 14, wherein modifying the uplink communication scheme comprises:
   transmitting a negative acknowledgment message indicating that one or more successfully received uplink traffic packets were not successfully received.

21. The method of claim 14, wherein modifying the uplink communication scheme comprises:
   transmitting an acknowledgment for only a subset of a plurality of medium access control protocol data units associated with a physical layer protocol data unit.

22. The method of claim 14, wherein modifying the uplink communication scheme comprises:
   transmitting an indication of a change from a first block acknowledgment window to a second block acknowledgment window that has a shorter duration than the first block acknowledgment window.

23. The method of claim 14, wherein the access point and the station are associated with a first basic service set, wherein modifying the uplink communication scheme comprises:
   transmitting a command indicating that the station is to disassociate with the first basic service set;
   wherein the communicating with the station comprises communicating a context of the station to a second access point based at least in part on transmitting the command.

24. The method of claim 14, wherein modifying the uplink communication scheme comprises:
   transmitting an indication of a change from a first modulation and coding rate for uplink transmissions to a second modulation and coding rate for uplink transmissions that has a smaller modulation and coding rate than the first modulation and coding rate;
   wherein the communicating with the station is performed in accordance with the second modulation and coding rate for uplink transmissions.

25. The method of claim 14, wherein modifying the uplink communication scheme comprises:
   refraining from transmitting one or more acknowledgment messages.

26. The method of claim 14, wherein modifying the uplink communication scheme comprises:
   transmitting a feedback message that comprises a congestion notification.

27. An apparatus for wireless communications at an access point, comprising:
   means for receiving, from a station, uplink traffic of a traffic flow for forwarding to a backhaul network via a backhaul link;
   means for monitoring a buffer of the access point to determine that a quantity of buffered uplink traffic received from the station exceeds a buffer quota, the buffer quota set for the traffic flow based at least in part on a traffic throughput capacity of the backhaul link and a throughput parameter for the traffic flow, wherein the throughput parameter indicates an uplink throughput commitment by the access point to the station for the traffic flow;
   means for modifying, based at least in part on the quantity of buffered uplink traffic exceeding the buffer quota, an uplink communication scheme to reduce the quantity of uplink traffic from the station; and
   means for communicating with the station based at least in part on the modified uplink communication scheme.

28. The apparatus of claim 27, wherein the means for modifying the uplink communication scheme comprise:
   means for transmitting an indication that the station is to pause uplink transmission.

29. A non-transitory computer-readable medium storing code for wireless communications at an access point, the code comprising instructions executable by one or more processors to:
   receive, from a station, uplink traffic of a traffic flow for forwarding to a backhaul network via a backhaul link;
   monitor a buffer of the access point to determine that a quantity of buffered uplink traffic received from the station exceeds a buffer quota, the buffer quota set for the traffic flow based at least in part on a traffic throughput capacity of the backhaul link and a throughput parameter for the traffic flow;
   modify, based at least in part on the quantity of buffered uplink traffic exceeding the buffer quota, an uplink communication scheme to reduce the quantity of uplink traffic from the station, wherein the throughput parameter indicates an uplink throughput commitment by the access point to the station for the traffic flow; and
   communicate with the station based at least in part on the modified uplink communication scheme.

30. The non-transitory computer-readable medium of claim 29, wherein the instructions to modify the uplink communication scheme are executable by the one or more processors to:
   transmit an indication that the station is to pause uplink transmission.

* * * * *